US008475022B2

(12) United States Patent
Singh et al.

(10) Patent No.: US 8,475,022 B2
(45) Date of Patent: Jul. 2, 2013

(54) ARTICULATING REFLECTOR LIGHTING ASSEMBLY FOR A VEHICLE

(75) Inventors: Sarbjit Singh, Canton, MI (US); Edward R. Golden, Pinckney, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 366 days.

(21) Appl. No.: 12/962,815

(22) Filed: Dec. 8, 2010

(65) Prior Publication Data

US 2012/0147615 A1    Jun. 14, 2012

(51) Int. Cl.
 *F21V 19/02* (2006.01)
(52) U.S. Cl.
 USPC ........... 362/523; 362/524; 362/525; 362/526; 362/527; 362/529; 362/530; 362/531; 362/532; 362/543; 362/544; 362/545; 362/546; 362/548; 362/549
(58) Field of Classification Search
 USPC .................................. 362/459–549
 See application file for complete search history.

(56) References Cited

U.S. PATENT DOCUMENTS

| | | | |
|---|---|---|---|
| 4,644,448 A | 2/1987 | Heiler | |
| 4,739,223 A | 4/1988 | Baba et al. | |
| 4,943,895 A | 7/1990 | Brandenburg | |
| 6,799,874 B2 | 10/2004 | Nakata | |
| 6,953,274 B2 | 10/2005 | Rice | |
| 7,699,514 B2 | 4/2010 | Shimada | |
| 7,708,439 B2 | 5/2010 | Naganawa et al. | |
| 7,758,218 B2 | 7/2010 | Mochizuki et al. | |
| 7,775,695 B1 | 8/2010 | Rose | |
| 7,784,985 B2 | 8/2010 | Meyrenaud | |
| 2004/0100803 A1* | 5/2004 | Steward | 362/505 |
| 2005/0036326 A1* | 2/2005 | Van Duyn | 362/475 |
| 2008/0115414 A1* | 5/2008 | Hogan | 47/66.6 |
| 2008/0253143 A1* | 10/2008 | Blandin et al. | 362/523 |
| 2012/0147616 A1 | 6/2012 | Singh et al. | |

OTHER PUBLICATIONS

Fujita, Takeshinge; Ichihara, Takeo; and Oyama, Hiroo, Development of MR (Multi Reflector) Headlamp (Headlamp with Slant Angle of 60 Degrees, Contributable to Future Vehicle Body Styling), SAE International Paper No. 870064, published Feb. 1, 1987, 1 page.

* cited by examiner

*Primary Examiner* — William Carter
(74) *Attorney, Agent, or Firm* — Raymond Coppielle; Prince Heneveld LLP

(57) ABSTRACT

A vehicle lighting assembly is provided which includes a housing, first and second light sources located in the housing, and an articulating reflector. The articulating reflector is located within the housing and moves between a use position in front of the first light source to reflect light from the second light source and a retracted position. Accordingly, light assembly housing is effectively used to provide a secondary light source, such as a daylight running lamp.

20 Claims, 3 Drawing Sheets

ARTICULATING REFLECTOR LIGHTING ASSEMBLY FOR A VEHICLE

FIELD OF THE INVENTION

The present invention generally relates to vehicle lighting, and more particularly relates to articulating lighting assemblies for vehicles.

BACKGROUND OF THE INVENTION

Automotive vehicles are generally designed with aerodynamic shaped bodies which often result in large plan view angles and large side view rake angles for the body surfaces. These angles generally compound to reduce the effect of frontal surfaces available for the packaging of content on vehicle headlamps and tail lamps. The severe rake angle of the headlamp and the tail lamp surfaces as seen in the side view typically creates a large shelf of unused space in front of the functional reflector and lighting elements.

Some vehicles have motor actuated flip up headlamp assemblies that flip up or rotate to provide the lighting function. The entire flip up headlamp typically includes multiple lighting devices located within a sealed housing to accommodate various lighting needs. When not in use, the flip up headlamp assembly may be rotated down so that it rests flush with the vehicle body surface to provide an aerodynamic shaped surface for the vehicle. Conventional flip up lighting assemblies generally may be susceptible to failure.

SUMMARY OF THE INVENTION

According to one aspect of the present invention, a vehicle lighting assembly is provided. The lighting assembly includes a housing, a first light source located in the housing, and a second light source located in the housing. The lighting assembly also includes an articulating reflector located within the housing and movable between a use position in front of the first light source to reflect light from the second light source and a retracted position.

According to another aspect of the present invention, a vehicle lighting assembly is provided that includes a housing having a lighting window and a light source disposed outside of the lighting window. The lighting assembly also includes an articulating reflector located within the housing. The articulating reflector is movable between a use position within the lighting window to reflect light from the light source in the lighting window and a retracted position stowed outside the lighting window.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
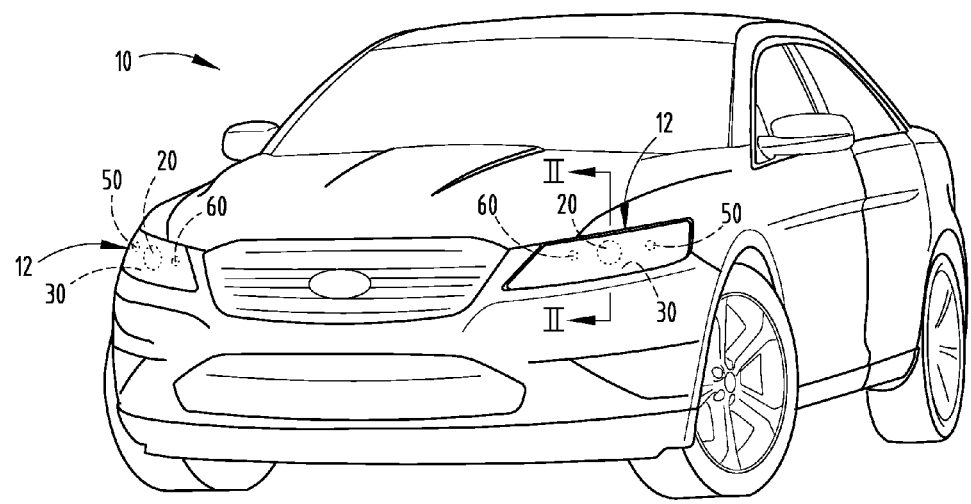
FIG. 1 is a front perspective view of a vehicle having a pair of front headlamp lighting assemblies employing an articulating reflector, according to one embodiment.
Figure 2:
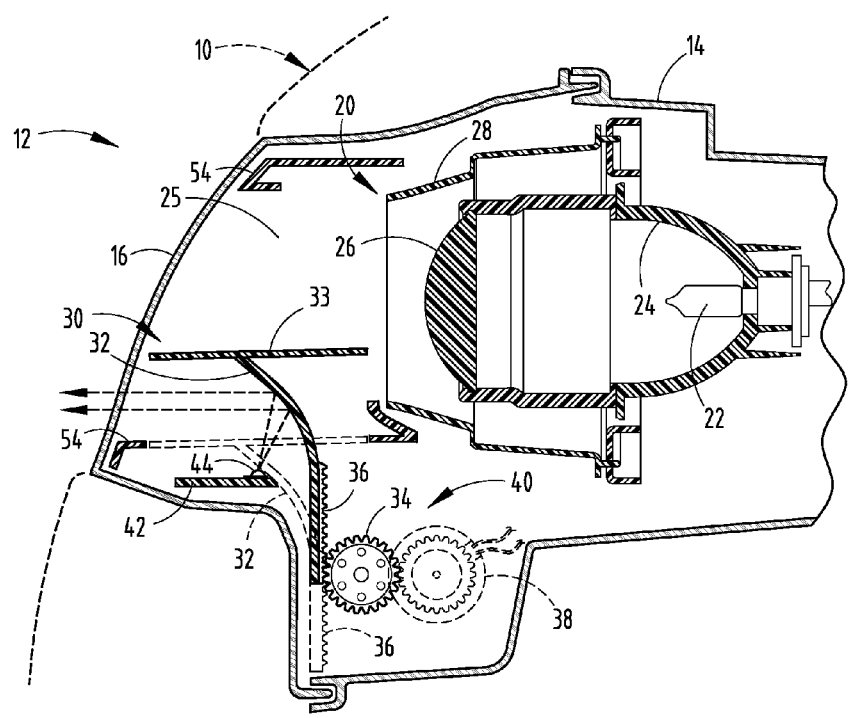
FIG. 2 is an enlarged cross-sectional view taken through II-II of FIG. 1 further illustrating the lighting assembly.

For purposes of description herein, the terms "upper," "lower," "right," "left," "rear," "front," "vertical," "horizontal," and derivatives thereof shall relate to the vehicle 10 and the lighting assembly 20 as oriented in FIGS. 1 and 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, an automotive wheeled vehicle 10 is generally illustrated having a pair of lighting assemblies 12 shown generally located at left and right front sides of the vehicle 10, according to one embodiment. The lighting assemblies 12 provide headlamp lighting and other exterior lighting for the vehicle 10 generally forward of the vehicle 10. Each lighting assembly 12 is shown having a first lighting device 20 with a first light source serving as a headlamp which may provide a low beam headlamp or headlight, according to one embodiment. According to another embodiment, first lighting device 20 may provide both high and low beam headlamps as is generally known in the vehicle lighting art. Each lighting assembly 12 also has a second lighting device 30 with a fixed second light source and an articulating reflector located generally forward of the first lighting device 20. According to one embodiment, the second lighting device 30 serves as a daylight running lamp (DRL) or daylight running light. Additionally, each lighting assembly 12 is further shown including a turn signal lamp 50 and a high beam headlamp 60. The high beam headlamp 60 is operable for use with the low beam headlamp 20 to provide increased light illumination, according to one embodiment. It should be appreciated that other combinations of lighting devices may be employed with the second lighting device 30 and lighting assembly 12. Each lighting assembly 12 generally includes a sealed housing which contains the various lighting devices as explained herein.

Figure 3:
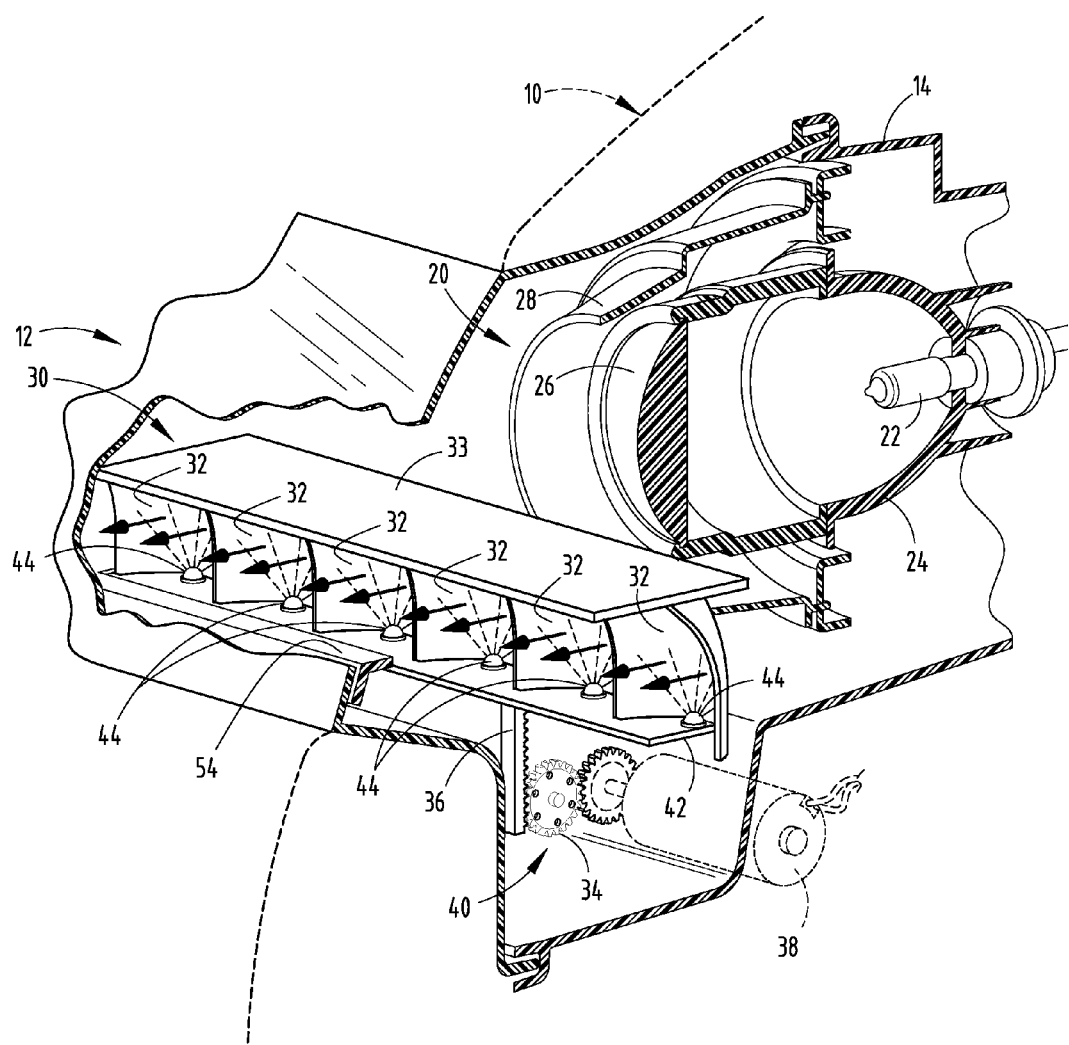
FIG. 3 is a perspective cross-sectional view further illustrating the articulating reflector lighting assembly with the reflector in the upward use position.
Figure 4:
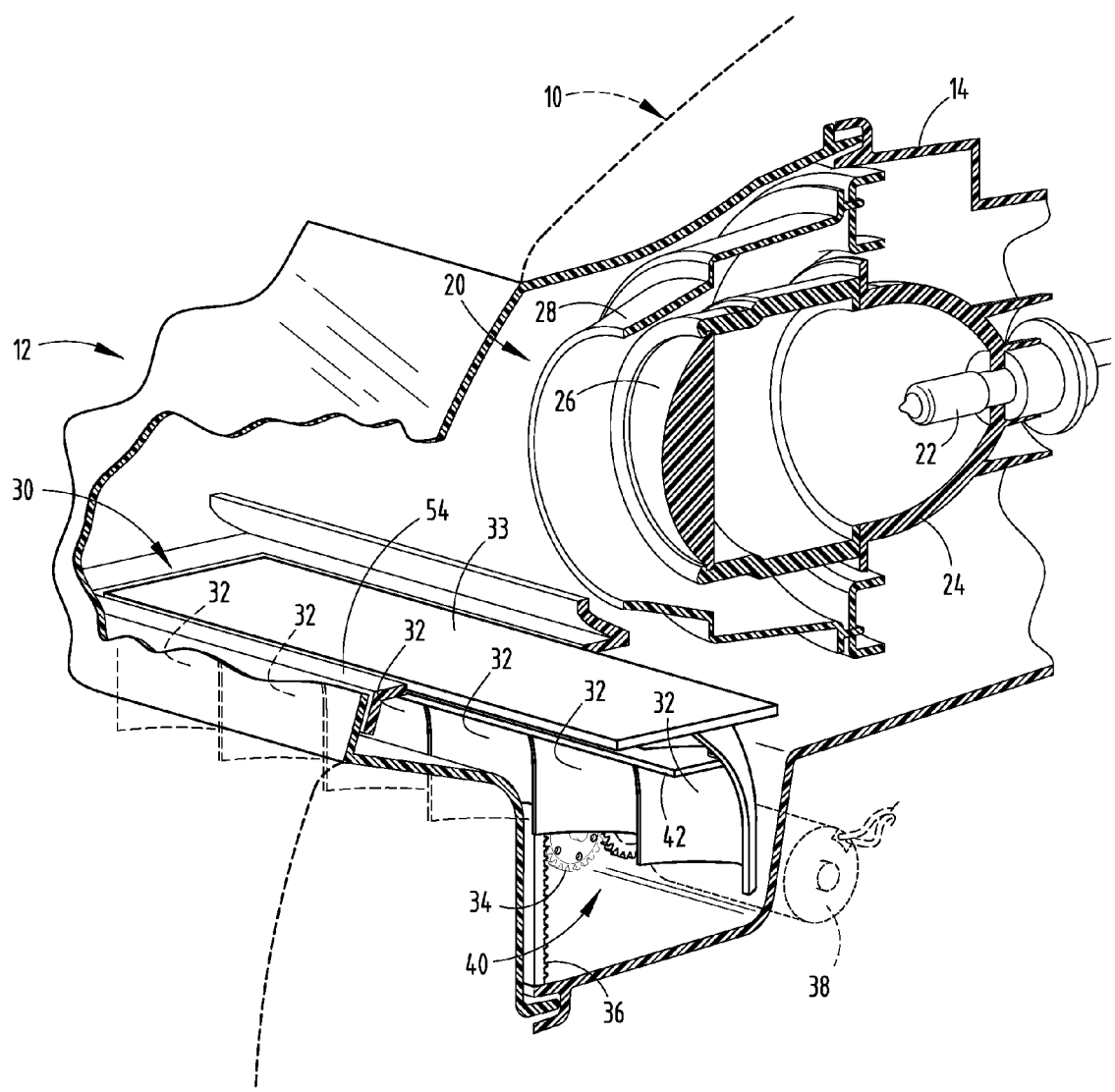
FIG. 4 is a perspective cross-sectional view of the lighting assembly further illustrating the reflector in the downward retracted position.

Referring to FIGS. 2-4, the lighting assembly 12 is illustrated having a housing generally made-up of a front housing member 16 and a rear housing member 14. The front housing member 16 has a clear transparent optical lens that allows light to pass therethrough. The front housing member 16 has an aerodynamic and aesthetically pleasing design that is installed into and conforms with the vehicle body. The front housing member 16 is sealed to the rear housing member 14 to provide a sealed housing enclosure that contains various lighting devices and associated components therein. In the embodiment shown, the headlamp 20 generally includes a light source 22, such as a halogen bulb or High Intensity Discharge (HID) bulb, located at the center of a reflector 24 and further has an optical lens 26 which may be assembled in front of the bulb 22 to form a sealed lighting device. The headlamp 20 is generally oriented forward to direct light emitted therefrom through the lighting window 25 and the lens of front housing member 16 to provide lighting in a beam generally forward of the vehicle 10. A projector ring 28 surrounds the outer wall of lens 26 and extends forward thereof. A bezel 54 is provided substantially within the front housing member 16 and generally surrounds the lighting window 25 through which light passes through the lens of the front housing member 16. When the headlamp 20 is turned on, the headlamp 20 provides light illumination that passes through the lighting window 25 inside bezel 54 and through the lens of front housing member 16 such that the light projects in a beam generally forward of the vehicle 10.

The second lighting device 30 of lighting assembly 12 includes one or more light sources 44 shown and described herein as light emitting diodes (LEDs) fixedly mounted onto a circuit board 42 within the housing and positioned relative to an articulating reflector 32. In the embodiment shown, six LEDs 44 are employed. The circuit board 42 and LEDs 44 are fixedly mounted below the bezel 54 and an opening formed in the bezel 54 through which the reflector 32 extends. The reflector 32 is actuatable by an actuator 40 to move between a use position within the lighting window 25 in front of the first light source 20 to reflect light from the second light sources 44 generally forward as shown in FIGS. 2 and 3 and a retracted or stowed position below the bezel 54 and outside the lighting window 25 as shown in FIG. 4.

The articulating reflector 32 has one or more light reflective surfaces which when properly positioned relative to the light sources 44 reflects the light forward in the lighting window 25 and through the lens of the front housing 16 in a beam directed forward of the vehicle 10. The reflector 32 includes one or more forward facing shaped reflector surface portions and a top sheet 33. In the embodiment shown, six reflector surface portions are employed. Each reflector surface portion is aligned with a different one of the LEDs 44 to reflect vertically directed light from each corresponding LED 44 by about ninety degrees (90°) onto a substantially horizontal axis forward in the lighting window 25 when the reflector 32 is in the upward use position. When the reflector 32 is in the upward use position, the reflector 32 is disposed at least partially in front of the headlamp 20, such that the headlamp 20 is partially blocked and may not be fully usable. Accordingly, in one embodiment, the reflector 32 may be deployed upward to provide lighting from the second light device 30 when the headlamp 20 is not used. In one embodiment, the second lighting device 30 serves as a daylight running light (DRL) which provide a secondary LED light source as opposed to employing the headlamp 20. The daylight running light may be useful for providing sufficient daytime lighting when the vehicle headlamps are not needed. The second lighting device 30 utilizes the articulating reflector 32 in a manner which effectively employs the space forward of the headlamp 20 within the housing formed by the front end rear housing members 16 and 14.

The second lighting device 30 is shown having six LEDs 42 and six corresponding reflector portions 32, according to one embodiment. The number of LEDs 42 and the number of reflector surface portions 32 may vary, depending on the amount of light desired, the intensity of the lighting devices 44, and the desired beam pattern. The shape of the individual reflector surface portions 32 may vary depending on the shape of the output light beam desired. In one embodiment, each reflector surface portion 32 has a parabolic shape. It should be appreciated that one or more light sources 44 and one or more reflector surface portions 32 may be employed in the second lighting device 30. It should further be appreciated that multiple light sources 44 may direct light onto a single shaped reflector surface.

The articulating reflector 32 includes an actuator 40 for actuating the reflector 32 vertically between upward use and downward stowed positions as shown in FIGS. 2-4. The actuator 40 includes a motorized gear and rack drive including an electric motor 38, a gear 34 and a rack 36, according to one embodiment. The motor 38 has a toothed output shaft which engages gear 34 which causes the rack 36 with the reflector 32 attached thereto to move vertically upward above bezel 54 into the lighting window 25 as shown in FIGS. 2 and 3 and downward to a position flush with or below bezel 54 outside of the lighting window 25 as shown in FIG. 4. When actuated to the upward use position, the reflector 32 exposes an opening in bezel 54 through which the second light sources 44 direct light. In the stowed position, the reflector via its top plate 33 serves as a cover to close the opening formed in the bezel 54.

The reflector 32 moves up and down relative to the second light sources 44 and their associated electronics including wires and circuit board 42, and does not require the articulation or movement of other lighting elements within the housing 16, 14. The housing 16, 14 remains fixed on the vehicle 10 such that it does not articulate. The actuator 40 and reflector 32 remain completely sealed within the housing such that quality issues associated with conventional assemblies having articulating elements exposed to the environment are minimized. It should be appreciated that the actuator 40 may employ other actuation devices, such as solenoids, vacuums, electrical or hydraulic actuators, according to other embodiments. Additionally, it should be appreciated that the actuator 40 may move the reflector 32 linearly or providing a rotational movement to position the reflector 32 with respect to the fixed light sources 44, according to further embodiments.

While the second lighting device 30 is shown and described herein having an articulating reflector 32 configured with multiple surface portions each having a parabolic shape, it should be appreciated that other reflector designs may be employed. It is further conceivable that the articulating mechanism shown and described herein as the reflector may include other components that move with the articulation mechanism. U.S. patent application Ser. No. 12/962,836, filed on the same date, and assigned to the Assignee of the present application is hereby incorporated herein by reference and discloses a lighting assembly having an articulating light source which includes a reflector and optic lens actuated by an actuation mechanism.

Accordingly, the vehicle lighting assembly 12 advantageously provides for a secondary lighting arrangement in which an articulating reflector 32 moves relative to fixed secondary light source(s) 44 to provide a secondary source of lighting within the housing 14, 16. The secondary light source 44 may provide daylight running lamps (DRL) that may be operated when the headlamp 26 is turned off. By employing the daylight running lamps within the housing 16 and forward of the headlamp 20, space within the housing 16, 14 is effectively utilized to provide the secondary lighting. While the lighting assembly 12 has been shown and described herein in connection with what is generally referred to as a vehicle headlamp assembly, it should be appreciated that the lighting assembly may employ an articulating reflector for use in other lighting devices on the vehicle 10, such as within the taillight assembly according to other embodiments.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A vehicle lighting assembly comprising:
   a light housing mounted to a vehicle;
   a first light source located in the housing;
   a second light source located in the housing; and
   an articulating reflector located within the housing and movable between a use position in an optical path in front of the first light source to reflect light from the second light source and a retracted position.

2. The lighting assembly of claim 1, wherein the second light source comprises a daylight running lamp.

3. The lighting assembly of claim 1, wherein the first light source comprises a vehicle headlamp.

4. The lighting assembly of claim 1, wherein the second light source comprises a plurality of light emitting diodes.

5. The lighting assembly of claim 4, wherein the articulating reflector comprises a plurality of reflector surfaces, wherein each lighting emitting diode reflects light off one of the reflector surfaces.

6. The lighting assembly of claim 1, wherein the articulating reflector comprises an actuator for moving the reflector between the use position and the retracted position.

7. The lighting assembly of claim 6, wherein the actuator comprises a motorized gear and rack drive.

8. The lighting assembly of claim 1, wherein the articulating reflector is retracted into a downward stowed position below the first light source.

9. The lighting assembly of claim 1, wherein the second light source is fixed at a location outside a lighting window of the first light source.

10. A vehicle lighting assembly comprising:
    a light housing mounted to a vehicle and having a lighting window with an optical path;
    a light source disposed outside of the lighting window; and
    an articulating reflector located within the housing and movable between a use position within the optical path of the lighting window to reflect light from the light source in the lighting window and a retracted position stowed outside the lighting window.

11. The lighting assembly of claim 10, wherein the articulating reflector moves between a use position in front of the lighting window and retracted position stored below the lighting window.

12. The lighting assembly of claim 10, wherein the light source comprises a daylight running lamp.

13. The lighting assembly of claim 10, wherein the light assembly comprises a plurality of light emitting diodes.

14. The lighting assembly of claim 13, wherein the articulating reflector comprises a plurality of reflector surfaces, wherein each light emitting diode reflects light off one of the reflector surfaces.

15. The lighting assembly of claim 10, wherein the articulating reflector comprises an actuator for moving the reflector between the use position and the retracted position.

16. The lighting assembly of claim 15, wherein the actuator comprises a motorized gear and rack drive.

17. The lighting assembly of claim 10 further comprising a headlamp disposed within the housing, wherein the light source is movable between a use position in front of the headlamp and a retracted position away from the headlamp.

18. The lighting assembly of claim 17 wherein the lighting source is fixed attached at a location below the headlamp.

19. A vehicle lighting assembly comprising:
    a light housing configured to mount to a vehicle;
    a first light source in the housing and having an optical path;
    a second light source in the housing; and
    an articulating reflector in the housing and movable between a retracted position and a use position in the optical path in front of the first light source to reflect light from the second light source.

20. The lighting assembly of claim 19, wherein the first light source comprises a vehicle headlamp and the second light source comprises a daylight running lamp.

* * * * *